M. DAVIS.
GRAIN SAVER.
APPLICATION FILED NOV. 1, 1917.
1,264,023.
Patented Apr. 23, 1918.
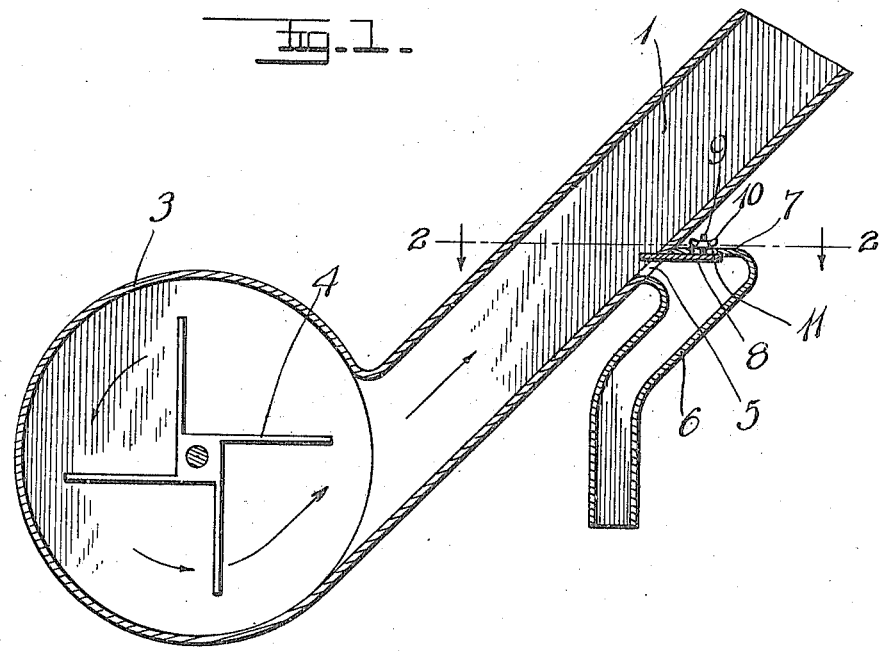
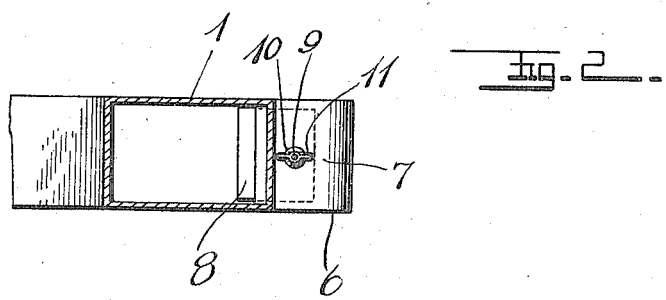
Witness
Inventor
Monroe Davis
By
Attorneys

UNITED STATES PATENT OFFICE.

MONROE DAVIS, OF ENID, OKLAHOMA.

GRAIN-SAVER.

1,264,023.  Specification of Letters Patent.  Patented Apr. 23, 1918.

Application filed November 1, 1917. Serial No. 199,703.

*To all whom it may concern:*

Be it known that I, MONROE DAVIS, a citizen of the United States, residing at Enid, in the county of Garfield and State of Oklahoma, have invented certain new and useful Improvements in Grain-Savers; and I do declare the following to be a full, clear, and exact description of the invention, such as will enable others skilled in the art to which it appertains to make and use the same.

My invention has for its object to provide a comparatively simple and inexpensive, yet a highly efficient device for collecting any grain which might otherwise be discharged with the straw through the stacking pipes of threshing machines and the like.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a vertical longitudinal section of the stacking pipe of a threshing machine showing the application of the invention; and Fig. 2 is a horizontal section on the plane of the line 2—2 of Fig. 1.

In the drawings above briefly described, the numeral 1 designates the stacking pipe of a threshing machine, said pipe being preferably rectangular in transverse section as shown in Fig. 2. Pipe 1 is provided at its lower end with a fan housing 3 within which is located a suitable fan 4, this fan serving to draw the straw and chaff into the housing and to force such straw and chaff therefrom by way of the pipe 1. Heretofore, any of the threshed grain escaping with the straw and chaff, was totally lost, but due to the nature of the present invention, any such loss is prevented.

The lower side of the pipe 1 is provided with an opening 5 extending throughout its width, and a branch pipe 6 leads from this opening, a portion 7 of the upper end of said branch pipe being joined to the pipe 1 above the opening 5, and positioned at an acute angle to said pipe as shown clearly in Fig. 1. To the lower side of the portion 7, a deflector plate 8 is secured by a suitable bolt 9 having a wing nut 10, said bolt passing through a slot 11 in said portion 7, so that the plate 8 may be adjusted inwardly and outwardly. The inner edge of plate 8 extends through the opening 5 into the stacking pipe 1 and is located at an acute angle to the travel of the straw.

By the construction above described, any threshed grain escaping with the straw and chaff, will travel upwardly along the lower side of the stacking pipe 1 until it strikes the deflector plate 8. When this occurs, however, the grain is directed into the branch pipe 6 and may be conducted thereby to a sack or other suitable receptacle. It will thus be seen that I have provided a simple and inexpensive device for effecting a great saving of grain during the threshing and stacking operation.

Since probably the best results are obtained from the several specific details shown and described, these details are by preference employed, but I wish it understood that within the scope of the invention as claimed, numerous minor changes may well be made.

I claim:

In a grain saving device, the combination of a straw discharge pipe extending upwardly to its delivery end and having an opening extending substantially throughout the width of one of its sides, a branch depending from said pipe and communicating with said opening, the outer wall of said branch being bent inwardly at its upper end and forming a plate-attaching portion extending from the upper edge of said opening at an angle to the side of said pipe, said portion having a slot, a grain deflecting plate in said branch and contacting with the lower side of said plate-attaching portion, said plate being slidable different distances into said pipe through said opening, and means passing through said slot and accessible from the exterior of said pipe for adjusting and clamping said deflecting plate.

In testimony whereof I have hereunto set my hand in the presence of two subscribing witnesses.

MONROE DAVIS.

Witnesses:
 GEO. D. WILSON,
 J. N. KEYS.

Copies of this patent may be obtained for five cents each, by addressing the "Commissioner of Patents, Washington, D. C."